United States Patent [19]

Rinehart

[11] Patent Number: 4,655,630

[45] Date of Patent: Apr. 7, 1987

[54] ROBOT ARM END ADAPTER

[75] Inventor: Ronald A. Rinehart, Ephrate, Pa.

[73] Assignee: Dana Corporation, Toledo, Ohio

[21] Appl. No.: 815,159

[22] Filed: Dec. 31, 1985

[51] Int. Cl.⁴ .......................... B25G 3/00; F16B 7/18
[52] U.S. Cl. .................................... 403/342; 403/343
[58] Field of Search .................... 403/342, 343; 279/91

[56] References Cited

U.S. PATENT DOCUMENTS

| 365,178 | 6/1887 | Gracey | 279/91 UX |
| 1,706,650 | 3/1929 | Brown | 279/91 UX |
| 2,567,036 | 9/1951 | Shannon | 403/342 X |
| 3,162,457 | 12/1964 | Iacco | 279/91 |
| 4,281,447 | 8/1981 | Miller et al. | 29/568 |
| 4,499,650 | 2/1985 | Cannon et al. | 29/568 |

FOREIGN PATENT DOCUMENTS 345580 3/1931 United Kingdom ................ 403/342

*Primary Examiner*—Andrew V. Kundrat
*Attorney, Agent, or Firm*—Marshall & Melhorn

[57] ABSTRACT

A device for attaching a tool to the end of a robot arm includes a collet having a truncated conical body with a radially outwardly extending flange formed at a larger end and a cylindrical holder having a tapered aperture for receiving the conical body of the collet. The collet has radially outwardly extending threads formed on the periphery of the flange to engage the threaded interior of a tubular collar. A radially inwardly extending flange on the collar engages a radially outwardly extending flange on the holder to retain the collet conical body in the tapered aperture thereby providing precise X-Y location. The flange on the collet is attached to a face place which is in turn attached to a tool, and an end of the holder is attached to a mounting flange which in turn is attached to an end of a robot arm. Means for preventing relative rotation between the collet and the holder includes a pair of longitudinally extending slots and cooperating key, or a pair of circular apertures and a cooperating pin.

26 Claims, 4 Drawing Figures

ROBOT ARM END ADAPTER

BACKGROUND OF THE INVENTION

The present invention relates to an adapter for connecting a tool to the end of a robot arm and, more particularly, to an adapter for permitting the rapid change of tools attached to a robot arm.

When a robot is utilized to perform a task, it is often desirable to be able to quickly change a tool attached to an end of an arm of the robot in the case of tool breakage or changing from one job to another. Many types of tool adapters are known in the prior art. For example, U.S. Pat. No. 4,239,431 discloses a robot having arms with multiple joints of the shaft and bearing type which are not easily disconnected. Such a hinge structure is utilized to connect an operating device such as a paint spray gun to the arm.

U.S. Pat. No. 4,281,447 discloses a system for removably attaching tools to a robot arm. The attaching mechanism includes a tapered bore adapted to receive a frustro-conical member with the conical member having a tapered bore for receiving a lock pin to attach the tool to the arm.

U.S. Pat. No. 4,489,629 discloses a boring and facing head provided with a coupling joint operatingly connected with a rotation device.

U.S. Pat. No. 4,499,650 discloses a machine tool with an automatic tool changing apparatus having a tool release mechanism which operates a quick change tool holder assembly. The release mechanism includes a pawl for gripping a tool holder lock nut and a tool holder cam operates a moveable stop mechanism for selectively engaging the pawl and the lock nut.

SUMMARY OF THE INVENTION

The present invention concerns a device for releasably attaching a tool to an end of a robot arm. The device includes a collet having a generally conical body truncated at a smaller end and having a radially outwardly extending flange formed at a larger end. The flange is attached to a face plate which in turn is attached to a tool. A holder has a generally cylindrical body with a tapered aperture formed concentric with a longitudinal axis of the body for accepting the conical collet body to provide precise X-Y alignment. The cylindrical holder body is attached to a mounting flange which in turn is attached to the end of a robot arm.

The flange on the collet has radially outwardly extending threads formed on the periphery thereof and a generally tubular collar has radially inwardly extending threads formed on an inner surface thereof for engaging the threads on the flange. The collar also includes a radially inwardly extending flange which cooperates with a radially outwardly extending flange formed on the holder to prevent the separation of the collet and the holder when the threads on the collet and collar are engaged. Also provided are means for preventing relative rotation between the collet and the holder about the longitudinal axis. In one embodiment of the invention, the means is a key of generally rectangular cross-section retained in corresponding slots formed in the conical body of a collet and the interior wall of the tapered aperture of the holder. In alternate embodiment, opposite ends of a pin are retained in apertures formed in the holder and the flange of the collet.

DESCRIPTION OF THE PREFERRED EMBODIMENT

Figure 1:
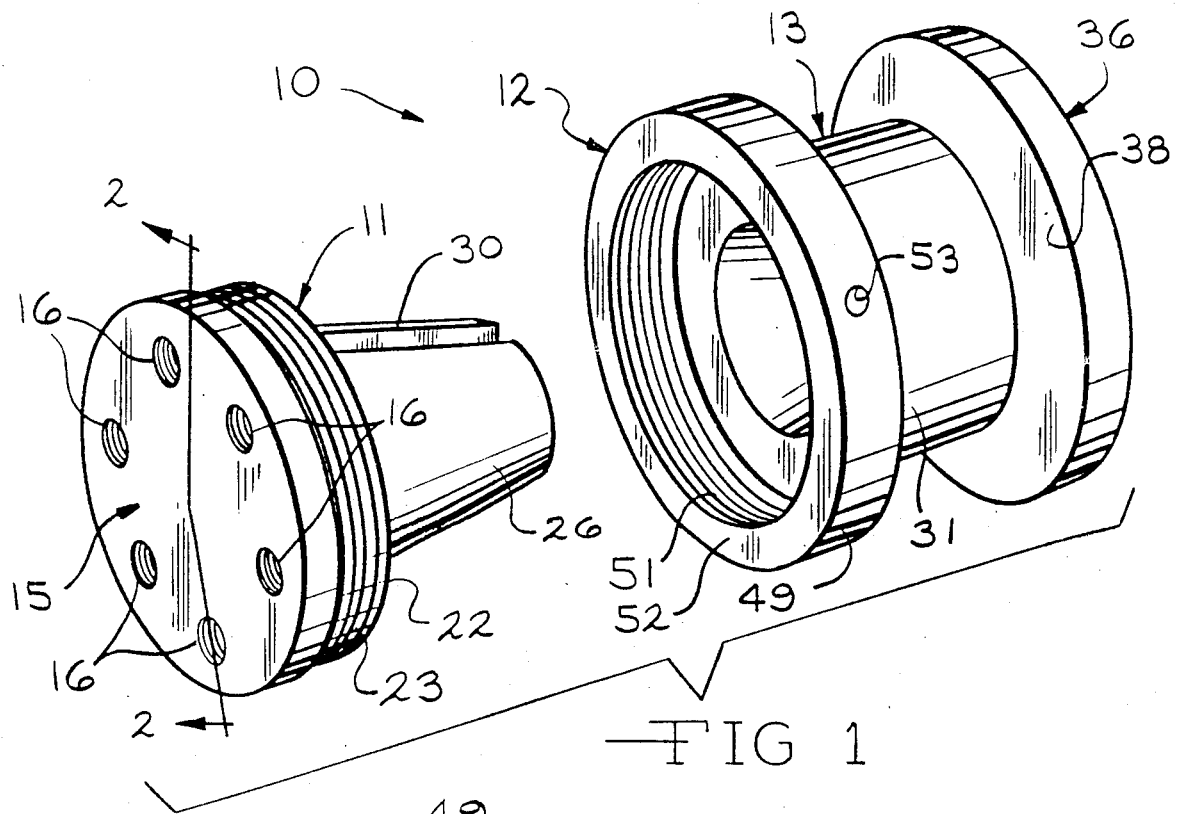
FIG. 1 is a perspective view of a partially disassembled robot arm end adapter according to the present invention.
Figure 2:
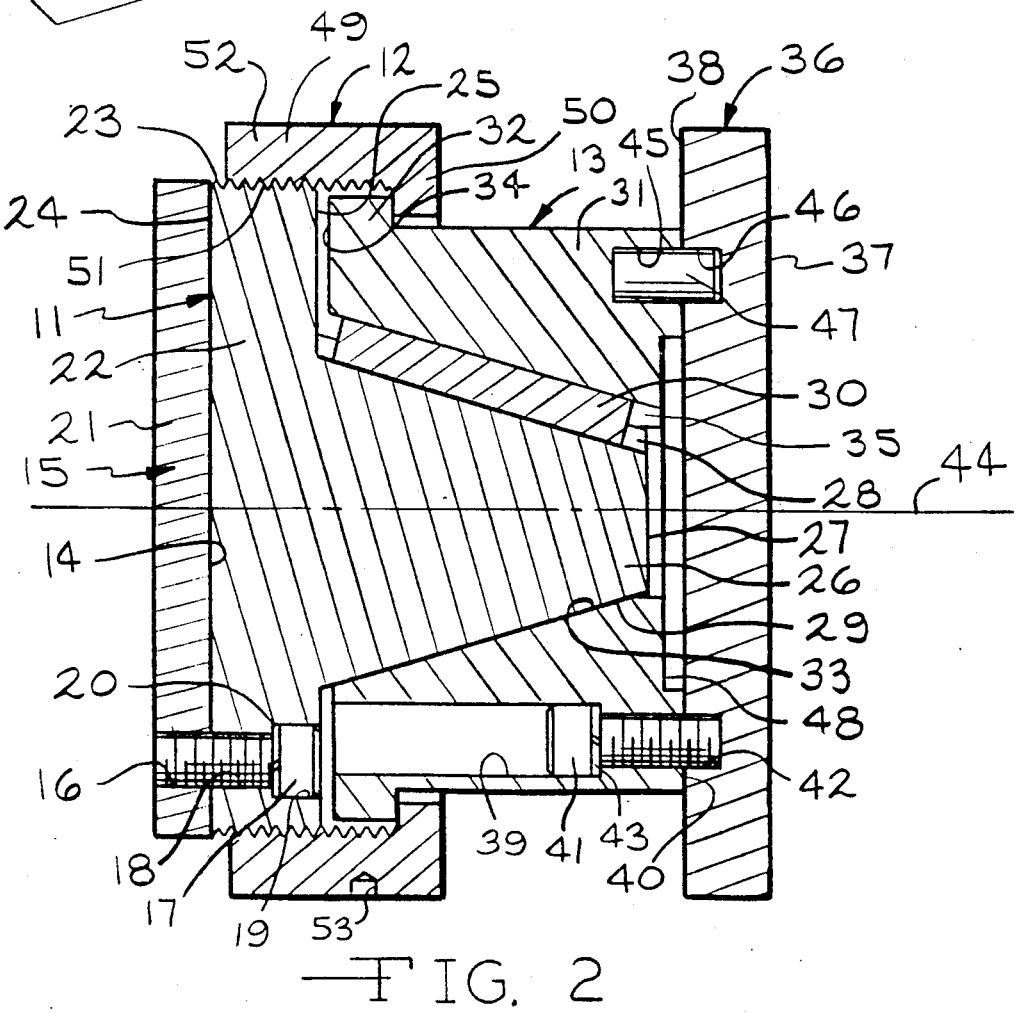
FIG. 2 is a cross sectional view, as if taken along the line 2—2 of FIG. 1 in cross-section but with the elements of the robot arm end adapter shown in FIG. 1 in an assembled condition.

Referring to FIG. 1 and FIG. 2, there is shown a robot arm end adapter according to the present invention. In FIG. 1, a collet 11 is shown detached from an associated collar 12 and holder 13. In FIG. 2, the robot end adaptor is shown in cross-section, as if taken along the line 2—2 in FIG. 1, but with the collet engaged with the collar 12 and the holder 13 for attaching a tool (not shown) to the end of a robot arm (not shown).

As shown in FIG. 2, the collet 11 is securely fastened to one face 14 of a generally cylindrical face plate 15 for attachment to an end effector or tool (not shown) to be attached on the end of a robot arm. The face plate 15 has a plurality of threaded apertures 16 formed therethrough. For illustrative purposes, six equally spaced apertures 16 are shown, each for engaging the threaded end of a bolt 17 extending through an aperture 18 formed in a flanged portion of the collet 11. The apertures 18 are aligned with the threaded apertures 16 in the face plate 15 and are countersunk as at 19 to receive and retain the head of the bolt 17. A lock washer 20 can be utilized under the head of the bolt 17 to prevent the bolt from becoming disengaged from the threaded aperture 16. An opposite surface 21 of the face plate 15 can be attached by any conventional means to an end effector or tool (not shown).

The collet 11 has a generally cylindrical flanged portion 22 having radially extending threads 23 formed on the periphery thereof. A surface 24 of the flanged portion 22 abuts the one face 14 of the face plate 15. An opposed surface 25 of the flanged portion 22 has the countersunk portions of the apertures 18 formed therein such that the heads of the bolts 17 are located below the surface 25. Extending outwardly from the surface 25 is a conical portion 26 which is truncated at a smaller end 27 to form a male taper for aligning the end effector or tool with respect to the robot arm. A longitudinally ending slot 28 is formed in an exterior surface 29 of the conical portion 26. The slot 28 retains a key 30 which is utilized to prevent rotation between the collet 11 and the holder 13.

The holder 13 has a generally cylindrical body 31 with a radially extending flange 32 formed at one end thereof. A tapered central aperture 33 is formed coaxially with the longitudinal axis of the body 31 and has a larger diameter end adjacent the flange 32 and a smaller diameter at the opposite end. The female taper 33 is formed at a angle that corresponds to the angle of taper of the conical portion 26 such that the outer surface of the conical portion 26 engages the surface defining the aperture 33 to space the inner surface 25 of the flanged portion 22 adjacent to, but not contacting a facing end surface 34 of the body 31. The key 30 extends from the slot 28 into a corresponding slot 35 formed in the surface of the tapered aperture 33. The slots 28 and 35 and the key 30 prevent relative rotation between the collet 11 and the holder 13.

The conical portion 26 and the tapered aperture 33 provide positive X-Y alignment between the collet 11 and the holder 13, thereby securely fixing a tool or end effector attached to the face plate 15 with respect a robot arm attached to the holder 13. A robot arm (not shown) can be attached to a robot mounting flange 36. The flange 36 is generally cylindrical in shape and has one surface 37 for attachment to the end of the robot arm and an opposed surface 38 for attachment to the cylindrical body 31. As shown in FIG. 2, the body 31 can have a countersunk aperture 39 formed therethrough extending from the end surface 34 to an opposite end surface 40. The aperture 39 receives a bolt 41 which extends into threaded engagement with a threaded aperture 42 formed in the surface 38 of the mounting flange 36. A lock washer 43 is utilized under the head of the bolt 41 to prevent the bolt from disengaging from the mounting flange 36 in response to vibration. Although only one aperture 39 and bolt 41 are shown, typically several are utilized to securely fasten the tapered body 31 to the mounting flange 36.

FIG. 2 is a sectional view as if taken along the line 2—2 in FIG. 1 with the collet 11, the collar 12 and the holder 13 assembled. Line 2—2 extends through a lower one of the apertures 18, through a longitudinal axis 44, and then is rotated approximately 30° to extend through the slots 28 and 35 and the key 30.

An aperture 45 is formed in the end surface 40 of the cylindrical body 31. A corresponding aperture 46 is formed in the surface 38 of the mounting flange 36. The apertures 45 and 46 receive opposite ends of a locating pin 47. The pin 47 is utilized to position the cylindrical body 31 with respect to the mounting flange 36 before the bolts 41 are inserted in the apertures 39 and threaded into the threaded apertures 42 in the mounting flange 36. The face 40 also has a circular recess 48 formed concentric with the longitudinal axis 44.

The collar 12 has a generally tubular body 49 having a radially inwardly extending flange 50 formed at one end thereof. The interior surface of the body 49 has threads 51 formed thereon for engaging the threads 23 formed on the periphery of the flanged portion 22 of the collet 11. The inner diameter of the flange 50 is slightly greater than the outer diameter of the cylindrical body 31 and slightly less than the outside diameter of the flange 32. Thus, the end surface 40 of the holder 13 is inserted through an open end 52 of the tubular body 49 and through the opening formed by the flange 50 until the flange 50 contacts the flange 32.

The holder 13 and the collar 12 are then attached to the mounting flange 36. Typically, the locating pin 47 is press fitted into the aperture 45 and then rotated into the aperture 46. Then a bolt 41 and lock washer 43 are inserted into each of the countersunk apertures 39 and the bolts are threaded into each of the threaded apertures 42 to securely fasten the holder 13 to the robot mounting flange 36. The collet 11 is assembled to the face plate 15 by inserting a bolt 17 and lock washer 20 into each of the apertures 18 and threading the bolts into the threaded apertures 16 in the face plate 15. Then the key 30 is inserted into the slot 28 in the collet 11. The conical portion 26 of the collet 11 is inserted into the tapered aperture 33 of the holder 13 with the upper portion of the key 30 engaging the slot 35 in the cylindrical body 31 of the holder 13. The threads 51 of the collar 12 are then engaged with the threads 23 on the flanged portion 22 of the collet 11 to force the conical portion 26 of the collet 11 into surface-to-surface engagement with the surface defining the tapered aperture 33. The conical portion 26 and the tapered aperture 33 cooperate to provide precise X-Y alignment and the key 30 cooperates with the slots 28 and 35 to prevent relative rotation between the collet 11 and the holder 13 about the longitudinal axis 44. Next, a tool (not shown) attached to the face plate 15 is firmly attached to a robot arm (not shown) connected to the robot mounting flange 36.

When it is desired to change tools, the collar 12 is disengaged from the flange portion 22 to release the collet 11 from engagement with the holder 13. One or more radially extending apertures 53 can be formed in the outer surface of the tubular body 49 of the collar 12 for engagement with a tool to assist in the rotation of the collar 12. The outer surface 49 of collar 12 may be also knurled to facilitate hand rotation of collar 12.

Figure 3:
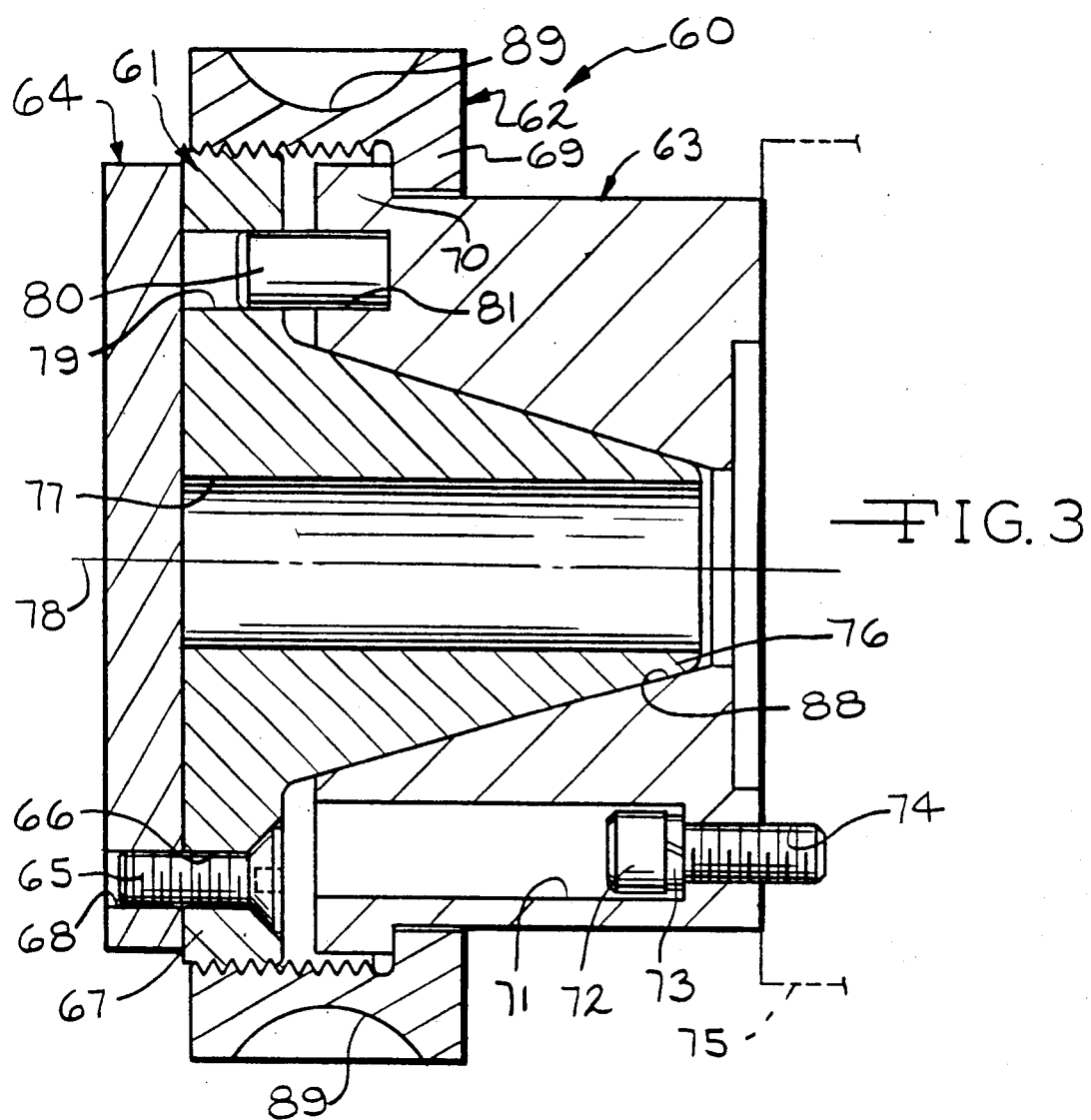
FIG. 3 is a cross-sectional view, similar to FIG. 2, but illustrating an alternate embodiment of the robot arm end adapter according to the present invention.
Figure 4:
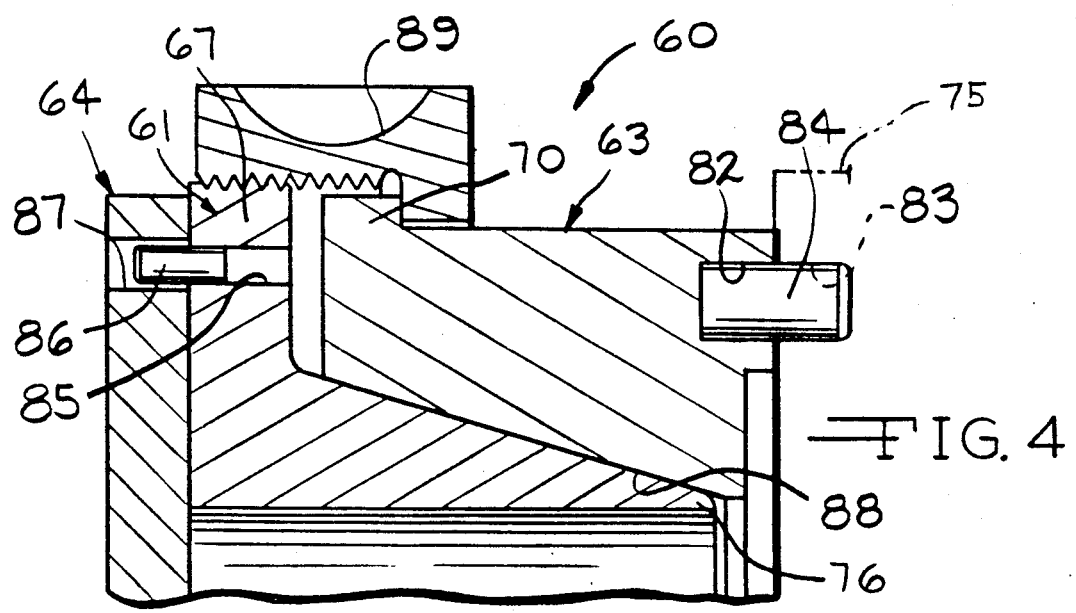
FIG. 4 is a partial cross-sectional view of the robot arm end adapter shown in FIG. 3.

There is shown in FIG. 3 and FIG. 4 an alternate embodiment of a robot arm end adapter according to present invention. The robot arm end adapter 60 includes a collet 61 threadably engaged by a collar 62 mounted on a holder 63 with the collet 61 attached to a face plate 64. The collet 61, collar 62, holder 63 and face plate 64 are similar to the collet 11, collar 12, holder 13, and face plate 15 of FIG. 1 and FIG. 2. The collet 61 is attached to the face plate 64 by one of more bolts 65 having a tapered head which is accepted by a similarly shaped countersunk aperture 66 formed in a radially outwardly extending flanged portion 67 of the collet 61. The threaded end of the bolt 65 engages a threaded aperture 68 formed in the face plate 64 to securely attach the collet 61 to the face plate 64. The collar 62 threadably engages the exterior of the flange portion 67 and has a radially inwardly extending flange 69 which engages a radially outwardly extending flange 70 formed at one end of the holder 63. The holder 63 has one or more countersunk apertures 71 formed therethrough each for accepting a bolt 72 and a lock washer 73. The bolt 72 engages a threaded aperture 74 formed in a robot mounting flange 75. The threaded aperture 74 and robot mounting flange 75 are shown in phantom in FIG. 3.

The collet 61 has a truncated conical portion 76 extending from the flanged portion 67. A central aperture 77 is formed concentric with a longitudinal axis 78 of the collet 61. An aperture 79 is formed through the flanged portion 67 of the collet 61 and accepts one end of a key or locating pin 80. The other end of the locating pin 80 is press fitted into an aperture 81 formed in the flanged portion 70 of the holder 63. The pin 80 prevents relative rotation between the collet 61 and the holder 63, thereby functioning in a manner similar to the key 30 of the robot end adapter shown in FIG. 2.

There is shown in FIG. 4 a partial cross-section of the robot arm end adapter 60 of FIG. 3 taken at a different angle with respect to the longitudinal axis 78. An aperture 82 is formed in the end of the holder 63 opposite the end having the flange 70. A corresponding aperture 83 is formed in the robot mounting flange 75 and the apertures 82 and 83 retain opposite ends of a locating pin 84. The locating pin 84 is press fitted into the aperture 82 and functions in a manner similar to the locating pin 47 of FIG. 2. The flange 67 of the collet 61 also has an aperture 85 formed therein for retaining one end of a locating pin 86 with a press fit. The opposite end of the locating pin 86 extends into an aperture 87 formed through the face plate 64.

The apertures 82 and 83 and the pin 84 are utilized to locate the holder 63 with respect to the robot mounting flange 75 while the bolts 72 are being engaged with the threaded apertures 74 to secure the holder to the mounting flange. Similarly, the apertures 85 and 87 and the pin 86 are utilized to locate the collet 61 with respect to the face plate 64 as the bolts 65 are engaged with the threaded apertures 68. Then the conical portion 76 of the collet 61 is inserted into a tapered central aperture 88 formed in the holder 63 and the pin 80 engages the aperture 79 to prevent relative rotation between the collet 61 and the holder 63. The collar 62 is then threadably engaged with the threads formed on the flanged portion 67 of the collet 61 to draw the collet 61 and the holder 63 together while the outer surface of the conical portion 76 engages the surface defining the tapered aperture 88 to locate the collet 61 and holder 63 precisely with respect to the X-Y axis of the attached tool and robot arm. One or more apertures 89 are formed in the periphery of the collar 62 to provide means for rotating the collar with respect to the collet and the holder. The periphery of collar 62 may also be roughened by knurling to facilitate hand rotation of collar 62.

It will be appreciated that, while the present invention has been specifically described as a means for connecting a tool to the end of a robot arm, the present invention can be used in other applications where it is desired to precisely locate one member relative to another member.

In accordance with the provisions of the patent statutes, the principle and mode of operation of the invention have been explained and what is considered to represent its preferred embodiments have been illustrated and described. It should, however, be understood that the invention may be practiced otherwise than as specifically illustrated and described without departing from its spirit and scope.

What is claimed is:

1. A device for releasably attaching a first member to a second member comprising:
    a collet having a generally conical body truncated at a smaller end and with a radially outwardly extending flange formed at a larger end, said flange including fastening means for attaching said flange to a first member, said fastening means including a face plate having one surface for attachment to the first member and an opposed surface for attachment to said flange, at least one threaded aperture formed in said face plate, at least one aperture formed in said flange, and a bolt extending through said aperture formed in said flange and having a threaded end retained in said threaded aperture for attaching said face plate to said flange;
    a holder having a generally cylindrical body with a tapered aperture formed concentric with a longitudinal axis of said cylindrical body, and including fastening means for attaching said body to a second member;
    means for releasably connecting said collet to said holder with said generally conical body inserted into said tapered aperture for limiting relative movement of said collet with respect to said holder; and
    means contacting said collet and said holder for preventing relative rotation between said collet and said holder about said longitudinal axis.

2. The device according to claim 1 wherein said flange has radially outwardly extending threads formed on a periphery, said means for releasably connecting includes a generally tubular collar having radially inwardly extending threads formed on an inner surface thereof for engaging said threads formed on said flange, and said collar and said holder have retaining means formed thereon for preventing separation of said collet and said holder when said threads on said collet and said threads on said collar are engaged.

3. The device according to claim 2 wherein said retaining means includes a radially inwardly extending flange formed on said collar and a cooperating radially outwardly extending flange formed on said holder.

4. The device according to claim 2 including at least one aperture formed in an exterior surface of said tubular collar for accepting means for rotating said collar with respect to said collet and said holder.

5. The device according to claim 2 having the exterior surface of said tubular collar roughened or knurled to facilitate hand rotation of said collar.

6. The device according to claim 1 wherein said fastening means for attaching said holder body to the second member includes a mounting flange having one surface for attachment to the second member and an opposed surface for attachment to said holder body, at least one threaded aperture formed in said mounting flange, at least one aperture formed in said holder body, and a bolt extending through said aperture formed in said holder body and having a threaded end retained in said threaded aperture for attaching said mounting flange to said holder body.

7. The device according to claim 1 wherein said means contacting said collet and said holder for preventing relative rotation includes a first aperture formed in said collet conical body, a second aperture formed in said holder cylindrical body, said first and second apertures being spaced from said longitudinal axis, and a key for engaging each of said first and second apertures for preventing relative rotation of said collet and said holder about said longitudinal axis.

8. The device according to claim 7 wherein said first aperture is a generally longitudinally extending slot formed in an outer surface of said conical body, said second aperture is a generally longitudinally extending slot formed in a surface defining said tapered aperture, and said key is a pin of generally rectangular cross section.

9. The device according to claim 7 wherein said first aperture is a generally longitudinally extending cylindrical opening formed in said flange of said collet, said second aperture is a generally longitudinally extending cylindrical opening formed in an end surface of said holder body, and said key is a pin of generally circular cross section.

10. A device for attaching a tool to an end of a robot arm comprising:
    a collet having a truncated generally conical body with a radially outwardly extending flange formed at a larger end, and first fastening means for attaching said flange to a tool;
    said first fastening means including means for releasably attaching said flange to the tool, said first fastening means further including pin means for locating said flange in a predetermined rotative position relative to the tool;

a holder having a generally cylindrical body with a tapered aperture formed concentric with a longitudinal axis of said body, and second fastening means for attaching said body to an end of a robot arm;

means for releasably connecting said collet to said holder with said generally conical body inserted into said tapered aperture for limiting relative movement of said collet with respect to said holder; and means contacting said collet and said holder for preventing relative rotation between said collet and said holder about said longitudinal axis.

11. The device according to claim 10 wherein said flange of said collet has radially outwardly extending threads formed on a periphery and including a generally tubular collar having radially inwardly extending threads formed on an inner surface thereof for engaging said threads on said flange, said collar and said holder having retaining means formed thereon for preventing separation of said holder from said collet when said holder and said collet are inserted into said collar and said collet and said collar are threadably engaged.

12. The device according to claim 11 wherein said retaining means includes a radially inwardly extending flange formed on said collar and a cooperating radially outwardly extending flange formed on said holder.

13. The device according to claim 11 including at least one aperture formed in an exterior surface of said tubular collar for accepting means for rotating said collar with respect to said collet and said holder.

14. The device according to claim 10 wherein said first fastening means for attaching said flange to a tool includes a face plate for attachment to a tool and a generally planar surface for abutting said flange, at least one threaded aperture formed in said planar surface, at least one aperture formed through said flange, and a bolt extending through said aperture in said flange into threaded engagement with said threaded aperture in said face plate.

15. The device according to claim 14 wherein said aperture in said flange is countersunk for retaining a head of said bolt.

16. The device according to claim 15 including a lock washer positioned between said head of said bolt and a stepped surface formed in said countersunk aperture.

17. The device according to claim 10 wherein said second fastening means for attaching said body to an end of a robot arm includes a mounting flange for attachment to an end of a robot arm and having a generally planar surface for abutting said holder, at least one threaded aperture formed in said planar surface, at least one aperture formed through said holder body, and a bolt extending through said aperture in said body into threaded engagement with said threaded aperture in said mounting flange.

18. The device according to claim 17 wherein said aperture in said body is countersunk for retaining a head of said bolt.

19. The device according to claim 18 including a lock washer positioned between said head of said bolt and a stepped surface formed in said countersunk aperture.

20. The device according to claim 14 wherein said an aperture formed in an end surface of said flange and including a locating pin having one end retained in said aperture, and wherein said plate has an aperture formed in said planar surface for retaining an opposite end of said locating pin.

21. A device for attaching a tool to an end of a robot arm comprising:

a collet having a truncated generally conical body with a radially outwardly extending flange formed at a larger end, and at least one longitudinally extending aperture formed through said flange;

a generally cylindrical face plate having a planar surface for attachment to a tool and an opposed planar surface for abutting said flange, at least one threaded aperture formed in said opposed surface, and a bolt having a head retained in said aperture in said flange and a threaded end extending through said aperture in said flange into threaded engagement with said threaded aperture in said face plate;

a holder having a generally cylindrical body with a tapered aperture formed concentric with a longitudinal axis of said body, and at least one aperture extending longitudinally through said body;

a generally cylindrical mounting flange having a planar surface for attachment to an end of a robot arm and an opposed planar surface for abutting said holder, at least one threaded aperture formed in said opposed surface, and a bolt having a head retained in said aperture in said body and a threaded end extending through said aperture in said body into threaded engagement with said threaded aperture in said mounting flange; and means contacting said collet and said holder for preventing relative rotation about said longitudinal axis of said holder.

22. The device according to claim 21 wherein said means for preventing relative rotation includes a longitudinally extending slot formed in an outer surface of said conical body, a longitudinally extending slot formed in an inner surface defining said tapered aperture, and a key retained in both of said slots.

23. The device according to claim 21 wherein said means for preventing relative rotation includes a longitudinally extending aperture formed in said flange of said collet, a longitudinally extending aperture formed in said body of said holder, and a pin retained in both of said apertures.

24. The device according to claim 10 wherein said fastening means includes means for releasably attaching said body to the robot arm, said second fastening means including second pin means for locating said body in a predetermined rotative position relative to the robot arm.

25. A device for attaching a tool to an end of a robot arm comprising:

a collet having a truncated generally conical body with a radially outwardly extending flange formed at a larger end, and first fastening means for attaching said flange to a tool;

a holder having a generally cylindrical body with a tapered aperture formed concentric with a longitudinal axis of said body, and second fastening means for attaching said body to an end of a robot arm;

said second fastening means including means for releasably attaching said body to the robot arm, said second fastening means including pin means for locating said body in a predetermined rotative position relative to the robot arm;

means for releasably connecting said collet to said holder with said generally conical body inserted into said tapered aperture for limiting relative movement of said collet with respect to said holder; and means contacting said collet and said holder for preventing relative rotation between said collet and said holder about said longitudinal axis.

26. A device for releasably attaching a first member to a second member comprising:

a collet having a generally conical body truncated at a smaller end and with a radially outwardly extending flange formed at a larger end, said flange including fastening means for attaching said flange to a first member;

a holder having a generally cylindrical body with a tapered aperture formed concentric with a longitudinal axis of said cylindrical body, and including fastening means for attaching said body to a second member, said fastening means including a mounting flange having one surface for attachment to the second member and an opposed surface for attachment to said holder body, at least one threaded aperture formed in said mounting flange, at least one aperture formed in said holder body, and a bolt extending through said aperture formed in said holder body and having a threaded end retained in said threaded aperture for attaching said mounting flange to said holder body;

means for releasably connecting said collet to said holder with said generally conical body inserted into said tapered aperture for limiting relative movement of said collet with respect to said holder; and means contacting said collet and said holder for preventing relative rotation between said collet and said holder about said longitudinal axis.

* * * * *